United States Patent
Nagao et al.

(10) Patent No.: US 7,030,907 B2
(45) Date of Patent: Apr. 18, 2006

(54) IMAGE PICKUP APPARATUS OF A SURROUNDING AREA OF A VEHICLE

(75) Inventors: Mitsuyoshi Nagao, Shizuoka (JP); Hidenori Sato, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 699 days.

(21) Appl. No.: 10/170,574

(22) Filed: Jun. 14, 2002

(65) Prior Publication Data
US 2003/0043280 A1 Mar. 6, 2003

(30) Foreign Application Priority Data
Sep. 6, 2001 (JP) .............................. 2001-269985

(51) Int. Cl.
*H04N 5/225* (2006.01)
(52) U.S. Cl. .................................... 348/164
(58) Field of Classification Search ............... 348/164, 348/294
See application file for complete search history.

(56) References Cited

U.S. PATENT DOCUMENTS 4,694,295 A * 9/1987 Miller et al. ................ 340/903
5,796,094 A 8/1998 Schofield et al.
6,281,806 B1 * 8/2001 Smith et al. ................ 340/901
6,501,085 B1 * 12/2002 Yoshida .................. 250/559.38

OTHER PUBLICATIONS

Anonymous, Research Disclosure Journal, vol. 440, No. 103, XP-002267908, 3 pages, "Anti-Blinding Scheme for Near-Infrared Diode-Laser-Based Active Night-Vison", Dec. 10, 2000.

* cited by examiner

*Primary Examiner*—David Ometz
*Assistant Examiner*—Anthony J Daniels
(74) *Attorney, Agent, or Firm*—Oblon, Spivak, McClelland, Maier & Neustadt, P.C.

(57) ABSTRACT

An image pickup apparatus which is equipped in a vehicle includes an infrared light emitter, an infrared camera and an infrared light sensor. The infrared light emitter irradiates an infrared light towards a surrounding area of the vehicle. The infrared camera performs an image pickup by receiving a reflected infrared light, which is emitted from the infrared light emitter and is reflected by an obstacle present in the surrounding area. The infrared light sensor detects a pulse light ranging from near-infrared region to infrared region, which is irradiated from an oncoming vehicle. The infrared camera delays performing the image pickup when the infrared light sensor detects the pulse light.

7 Claims, 3 Drawing Sheets

IMAGE PICKUP APPARATUS OF A SURROUNDING AREA OF A VEHICLE

BACKGROUND OF THE INVENTION

1. Field of the Invention

The present invention relates to an image pickup apparatus, which picks up an image of a surrounding area of a vehicle. More specifically, the present invention relates to an apparatus for performing the image pickup of an area surrounding a vehicle by irradiating an invisible light, such as light of infrared region from near infrared region.

2. Description of the Related Art

In the vehicle, conventionally, a headlight for securing the visibility of a driver is provided for achieving the safe driving. When traveling the vehicle under low visibility, such as night or fog, just use of the headlight is not enough to secure the visibility for achieving the safe driving An image pickup apparatus using an infrared light has been developed for supplying the better visibility to a driver driving a vehicle at night, etc.

In the image pickup apparatus, the existence of obstacles, such as vehicle, animals, and humans, which are presenting in the area not covered by the headlight, is detected by picking up the far-inflated light emitted from obstacles.

A technique, in which the image picked by the image pickup apparatus is displayed on the windshield using a virtual display apparatus, has also been developed as one of means for notifying the existence of the obstacles to a driver.

In the image pickup apparatus, there has been developed the technique, in which the infrared camera is adopted, for achieving the certain image pickup of obstacles existing in the surrounding area. In this infrared camera, the image pickup of obstacle is achieved by detecting the reflected infrared light, which is irradiated from the infrared light emitter and is reflected by the obstacles.

When the vehicle equipping the infrared light emitter is traveling on the road adopting the system of driving on the side of the road facing oncoming traffic, the same image pickup apparatus may be equipped in the oncoming vehicle. In that occasion, if infrared light is irradiated from the oncoming vehicle and is received by the infrared camera equipped in the vehicle, the image obtained by the infrared camera equipped in the vehicle on driving is engulfed in a uniformly white glow. Thus, the image pickup is prevented and a driver cannot identify the presence of the obstacles. This phenomenon is known as "whiteout phenomenon".

Therefore, the image pickup apparatus, which can achieve the image pickup of the surrounding area by receiving the reflected light, which is irradiated from the infrared light emitter of the vehicle and is reflected by the obstacles, has been required.

SUMMARY OF THE INVENTION

The present invention relates to an image pickup apparatus, which is equipped in a vehicle and is used for obtaining an image of the surrounding area by performing the image pickup.

This image pickup apparatus has an infrared light emitter for irradiating an infrared light towards the surrounding area of the vehicle, an infrared camera capable of performing the image pickup by receiving the reflected infrared light, and an infrared light sensor for detecting a pulse light of infrared region from near-infrared region to be irradiated form oncoming vehicle.

In this image pickup apparatus, if the obstacle is presenting in the area covered with the infrared light emitted from the infrared light emitter, since the reflected infrared light, which is irradiated from the infrared light emitter and is reflected by the obstacles, is recorded by the infrared camera, a driver of the vehicle can recognize existence of the obstacle.

In the present invention, furthermore, the recording by the infrared camera is aborted, when the infrared light irradiated from the oncoming vehicle is detected by the infrared light sensor.

In the present invention, preferably, the infrared light emitting apparatus and the infrared camera are provided at the inner mirror of the vehicle.

In the present invention, furthermore, a synchronizer for controlling the irradiation of the infrared light so that the irradiation by the infrared light emitter may be intermittently performed synchronizing with the shutter releasing movement of the infrared camera.

DETAILED DESCRIPTION OF THE INVENTION

The explanation about the present invention will be carried out as below.

Figure 1A:
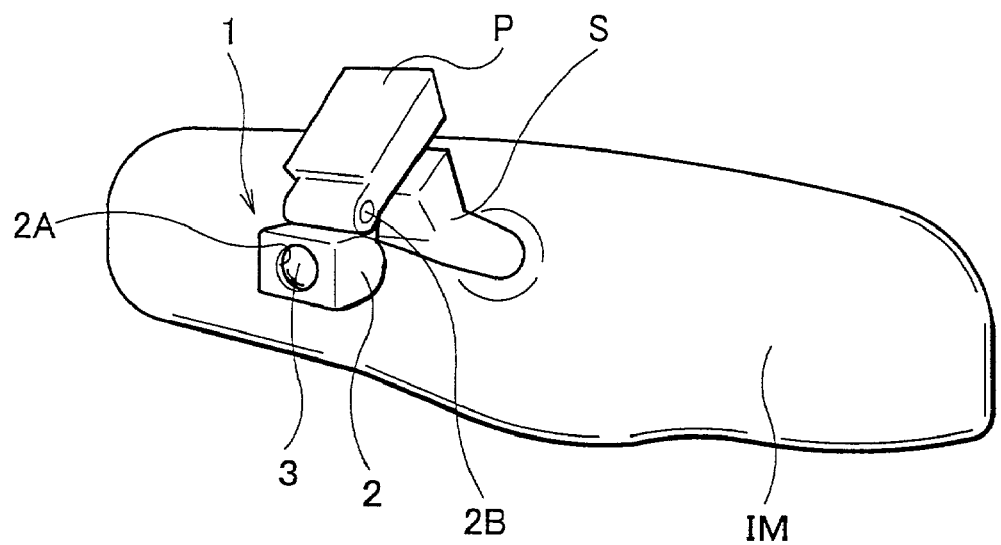
FIG. 1A is a perspective view showing the surroundings of the image pickup apparatus.
Figure 1B:
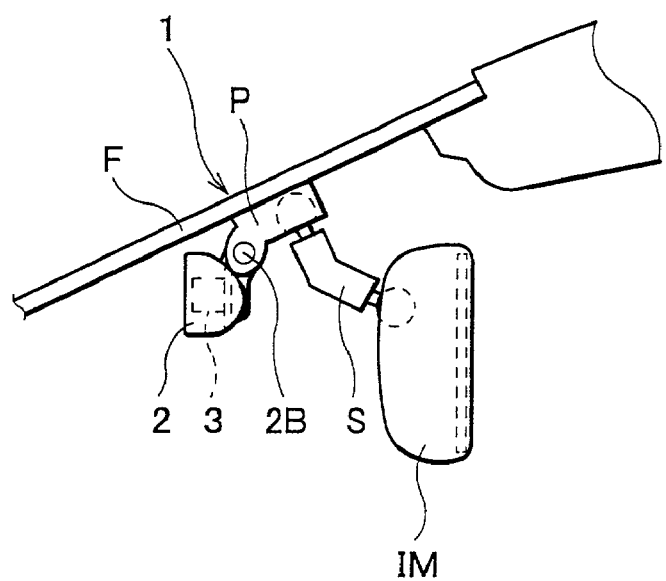
FIG. 1B is a side-sectional view showing the surroundings of the image pickup apparatus.
Figure 2:
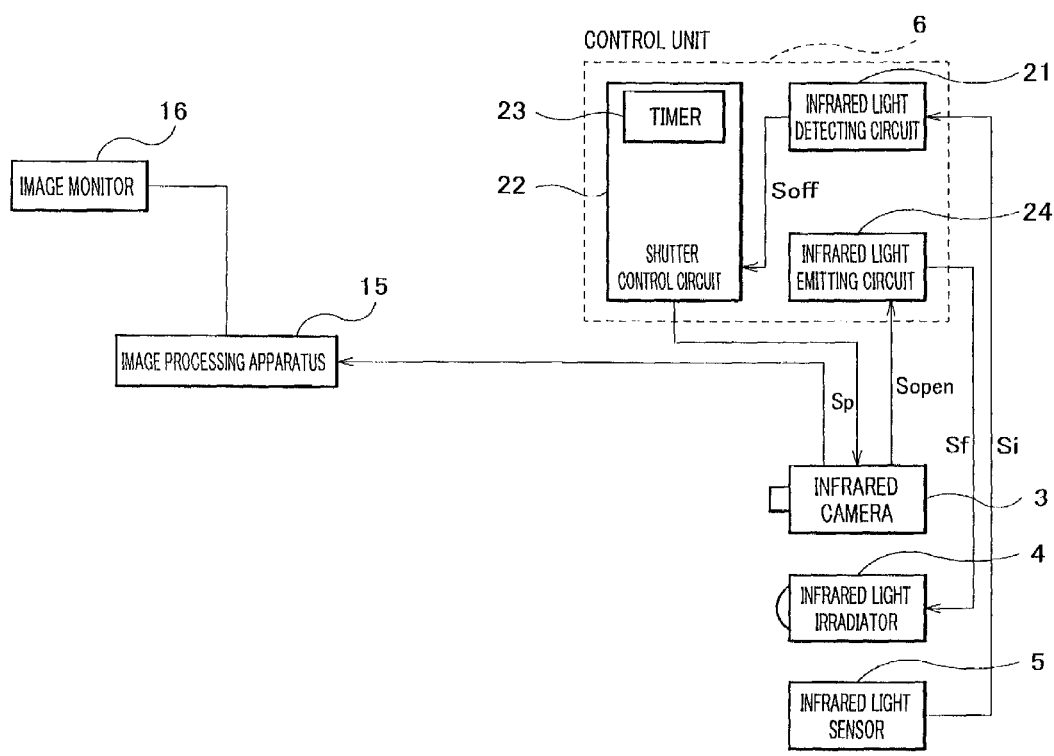
FIG. 2 is a brock diagram of the image pickup apparatus.

FIG. 1A is a perspective view showing the surroundings of an image pickup apparatus of a vehicle. FIG. 1B is a side sectional view of an image pickup apparatus. FIG. 2 is a block diagram of an image pickup apparatus.

As shown in FIG. 1, an image pickup apparatus according to the present invention is attached to a fixing part P, to which a stay S of an inner mirror IM is engaged.

The inner mirror IM is attached to a windshield F through the stay S, and the orientation thereof is adjusted by shifting the stay S in compliance with the differences of a driver's body for securing the rear-side visibility of a driver. The orientation of the image pickup apparatus 1 is constructed so as not to be changed for keeping the irradiating direction even if the orientation of the inner mirror IM is adjusted for facing the suitable direction. To be more precise, the irradiating direction of image pickup apparatus 1 is not affected by the adjustment of the inner mirror IM.

An image pickup apparatus 1 has a casing 2, in which an infrared camera 3 is accommodated. An eyelet 2A is provided at the front side of the casing 2 for allowing the pickup of the outside image with respect to the vehicle by the infrared camera 3.

The infrared camera 3 detects the light of infrared region from near-infrared region. A lens of the infrared camera 3 is disposed so as to face against the outside of the casing 2 and to pick up the image of the outside through the eyelet 2A.

Thereby, the image pickup of the outside, the front (fore) side image with respect to the vehicle, can be achieved.

The casing 2 is pivotably attached to the fixing part P through a hinge 2B. Thus, the adjustment of the orientation of the infrared camera 3 is allowed.

An infrared light irradiator 4 and an infrared light sensor 5 are stored within the casing 2. A control unit 6 is also stored in the casing 2 together with both the infrared light irradiator 4 and the infrared light sensor 5. The control unit 6 is electrically connected to each of the infrared camera 3, the infrared light irradiator 4, and the infrared light sensor 5.

The infrared light irradiator 4 has an emitting part, and a light pulse (infrared light) of infrared region from near-infrared region is irradiated from the emitting part.

The emitting part of the infrared light irradiator 4 is constituted so as to enable the irradiation of infrared light through the eyelet 1A provided on the casing 2. According to the present invention, if the obstacles is presenting in the area covered by the irradiated infrared light, the image of the obstacle is clearly picked up, and is acknowledged by a driver.

The infrared light sensor 5 detects the infrared light incoming from the outside. The infrared light incoming from the outside through the eyelet 2A is received at a light receiving part of the infrared light sensor 5. To be more precise, this infrared light sensor 5 detects the light pulse irradiated form the image pickup apparatus equipped in the oncoming vehicle.

The control unit 6 has a central processing unit (CPU), a read only memory (ROM), a memory, etc. The control unit 6 processes the computing based on signals outputted from the infrared camera 3 and an infrared light sensor 5, and outputs the predetermined signals, such as command signals, based on the computed result.

As shown in FIG. 2, an image processing apparatus 15 and an image monitor 16 are provided in addition to the casing 2, and are connected to the infrared camera 3.

The image processing apparatus 15 generates the images to be displayed on the image monitor 16 based on the image signal outputted from the infrared camera 3.

The image monitor 16 has a projector (not shown) for displaying the image on the windshield. The image obtained by the image pickup using the infrared camera 3 is displayed on the windshield by this projector. A CRT monitor, such as a monitor disposed on the instrument panel of the vehicle, etc, may be adopted as the image monitor instead of the projector.

The control unit 6 has an infrared light detecting circuit 21, a shutter controlling circuit 22, a timer 23, and an infrared light emitting circuit 24. The infrared light emitting circuit 24 is a synchronizer.

The infrared light detecting circuit 21 is connected to the infrared light sensor 5 and the shutter control circuit 22. This infrared light detecting circuit 21 detects whether or not the detecting signal Si is inputted from the infrared light sensor 5. Here, the detecting signal Si indicates that the infrared light (a light pulse) incoming from outside is detected by the infrared light sensor 5.

In the infrared light detecting circuit 21, the shutter OFF signal Soff is outputted to the shutter control circuit 22, when the detecting signal Si is inputted from the infrared light sensor 5. Here, the shutter OFF signal is a command signal, which commands the un-releasing of the shutter of the infrared camera 3.

The shutter control circuit 22 incorporates a timer 23, which counts the pickup intervals of the infrared camera 3. This pickup interval is established at predetermined value, for example, 1/60 seconds. Thus, the shutter control circuit 22 outputs the pickup signal Sp to the infrared camera 3 at every image pickup intervals. Here, the pickup signal Sp is a command signal, which commands the infrared camera to perform the image pickup.

In the shutter control circuit 22, the pickup signal Sp is not outputted to the infrared camera 3, when the shutter OFF signal Soff is inputted from the infrared light detecting circuit 21.

In the shutter control circuit 22, on the other hand, the pickup signal Sp is outputted to the infrared camera 3, after shutter OFF signal inputted from the shutter control circuit 22 is terminated. Thereby, the image pickup by the infrared camera 3 is performed with delayed timing, when the infrared light sensor 5 detects the infrared light (a pulse light) incoming from the surrounding area of the vehicle.

In other words, in the image pickup apparatus according to the present invention, the image pickup performed by the infrared camera 3 is aborted or delayed, if the infrared light (a pulse light), irradiated from another image pickup apparatus equipped in the oncoming vehicle and so on, is detected by the infrared light sensor 5.

The infrared camera 3 performs the image pickup of the surrounding area of the vehicle in response to the pickup signal Sp outputted from the shutter control circuit 22. In that occasion, the image pickup is achieved by releasing the shutter of the infrared camera 3 in response to the pickup signal Sp.

In the present embodiment, the image pickup by the infrared camera 3 is performed at the predetermined shutter speed, for example 1/4000 sec.

In the infrared camera 3, the shutter-releasing signal Sopen is outputted to the infrared light emitting circuit 24 while the shutter is released based on the pickup signal Sp inputted from the shutter control circuit 22. Here, the shutter-releasing signal Sopen is defined as the signal, which indicates that the shutter of the infrared camera 3 is released.

The infrared light emitting circuit 24 continuously outputs the emitting signal Sf to the infrared light irradiator 4, until the shutter-releasing signal Sopen inputted from the infrared camera 3 is terminated. Here, the emitting signal is a command signal, which commands the irradiation of the infrared light.

When the emitting signal Sf, which is outputted from the infrared light emitting circuit 24, is inputted to the infrared light irradiator 4, infrared light is irradiated to the outward with respect to the vehicle by supplying the electricity.

In the infrared light emitting circuit 24, the output of the emitting signal Sf to the infrared light irradiator 4 is continued until the shutter-releasing signal Sopen inputted from the infrared camera 3 is terminated. Thereby, the irradiation of infrared light from the infrared light irradiator 4 is continued while the shutter of the infrared camera is released for performing the image pickup.

[Motion of the Image Pickup Apparatus]

The motion of the image pickup apparatus according to the present invention will be explained below.

When the vehicle is traveling at night using a headlight for securing the visibility of a driver, the image pickup apparatus is running for detecting the obstacles, which are presenting in area not covered by the headlight and is on the advancing direction of the vehicle.

In the image pickup apparatus 1, the shutter control circuit 22 outputs the pickup signal Sp to the infrared camera 3 at every pickup interval. This pickup interval is established at predetermined value, for example 1/60 sec, and is counted by the timer 23 incorporated in the control unit 6.

In the infrared camera 3, the shutter of the infrared camera 3 is released in response to the pickup signal Sp, and the shutter-releasing signal Sopen is outputted to the infrared light emitting circuit 24 while the shutter is releasing.

In the infrared light emitting circuit 24, the emitting signal Sf is outputted to the infrared light irradiator 4, when the shutter-releasing signal Sopen is inputted.

In the infrared light irradiator 4, since the electric power is supplied while input of the emitting signal Sf is continued, infrared light is irradiated towards the advancing direction with respect to the vehicle for predetermined time, for example, 1/400 sec.

Thereby, the advancing direction of the vehicle is continuously irradiated with infrared light while the image pickup is performed by the infrared camera 3. Thus, the more clear image of the obstacles obtained by the image pickup can be figured, because the reflected infrared light, which is irradiated from the infrared light irradiator 4 and is reflected by the obstacles, is recorded by the infrared camera 3.

Figure 3A:
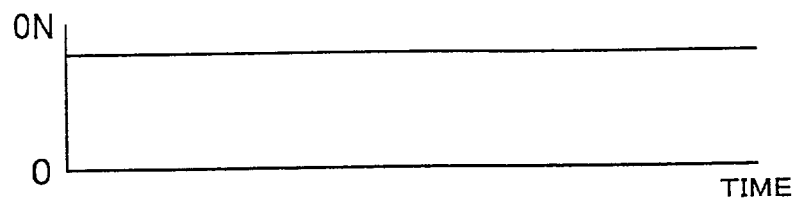
FIG. 3A is a graph showing the irradiating pattern when the infrared light apparatus is constantly operated.

As shown in FIG. 3A, the continuous irradiation of infrared light from the infrared light irradiator 4 without repeating the ON & OFF operation may be adoptable as an irradiation manner. When such manner is adopted, since the irradiation of infrared light is continuously performed by the infrared light irradiator 4 irrespective of the image pickup, it will be a waste of energy.

Figure 3B:
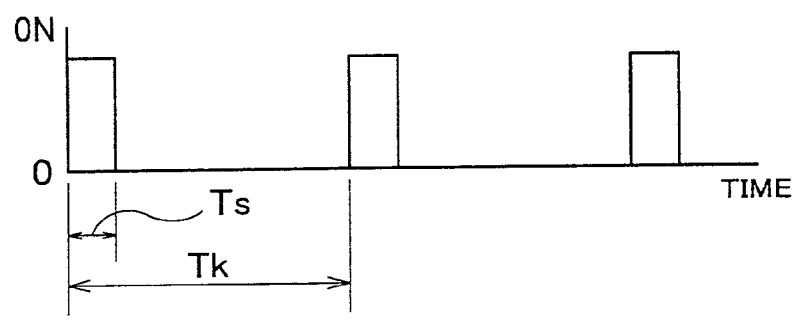
FIG. 3B is a graph showing the irradiating patter when the infrared light apparatus is intermittently operated.

In the image pickup apparatus 1, as shown in FIG. 3B, the irradiation by the infrared light irradiator 4 is intermittently performed. To be more precise, infrared light is irradiated, only when the image pickup by the infrared camera 3 is under operation.

In the image pickup apparatus of the present embodiment, the image pickup interval Tk is settled at 1/60 sec and the shutter speed Ts thereof is 1/400 sec. That is, the irradiation by the infrared light irradiator 4 is intermittently performed synchronizing with the movement of the shutter of the infrared camera 3. Thereby, the waste of energy can be prevented. In other words, since the supply of the energy is performed only when the image pickup is performed, the excess use of energy cannot be supplied.

In the present embodiment, the infrared light sensor 5 detects the presence of the infrared light (a pulse light) incoming from the surrounding area of the vehicle before performing the image pickup to the advancing direction of the vehicle.

When infrared light is not detected by the infrared light sensor 5, the signal is not outputted from the infrared light sensor 5. On the other hand, when infrared light is detected by the infrared light sensor 5, the detecting signal Si, which indicates the presence of infrared light, is outputted to the infrared light detecting circuit 21.

When the detecting signal Si is inputted to the infrared light detecting circuit 21, the shutter OFF signal Soff is outputted to the shutter control circuit 22.

In the shutter control circuit 22, the timer 23 is counting the image pickup intervals, i.e. 1/60 sec.

The shutter control circuit 22 also detects whether or not the shutter OFF signal is inputted from the infrared light detecting circuit 21, and outputs the pickup signal Sp to the infrared camera 3 if the shutter OFF signal Soff is not inputted. On the other hand, if the shutter OFF signal Soff is inputted, the output of the pickup signal Sp is idled until the input of the shutter OFF signal is terminated.

Then, the pickup signal Sp is outputted to the infrared camera 3, after the input of the shutter OFF signal is terminated. The termination of the shutter OFF signal Soff is brought out, when the infrared light incoming from the advancing direction with respect to the vehicle is terminated.

Thereby, the image pickup by the infrared camera 3 is performed while there is no infrared light incoming from the outside of the vehicle. Thus, the occurrence of the whiteout phenomenon can be prevented.

The shutter-releasing signal Sopen is continuously inputted to the infrared light emitting circuit 24 from the infrared camera 3 while the shutter of the infrared camera 3 is releasing.

In the infrared light emitting circuit 24, the emitting signal Sf is sent to the infrared light irradiator 4 while the shutter-releasing signal Sopen is inputted.

In the infrared light irradiator 4, the irradiation toward the outwards with respect to the vehicle is performed by supplying the electric current while the emitting signal Sf is inputted.

Thereby, the irradiation by the infrared light irradiator 4 is continued while the image pickup is performed by the infrared camera 3.

Since the irradiation by the infrared camera 3 is stopped while the infrared light sensor 5 is detecting the infrared light incoming from the outward of the vehicle, there is no point in irradiating infrared light by the infrared light irradiator 4.

After the detection of the infrared light by the infrared light sensor 5 is terminated, the image pickup by the infrared camera 3 is performed FIG. 4 is an explanation view showing the relation between the detected timing by the infrared light sensor 5 and the irradiating timing by the infrared light irradiator 4

In this explanation, it is assumed that the image pickup apparatus is also equipped in the oncoming vehicle.

Figure 4A:
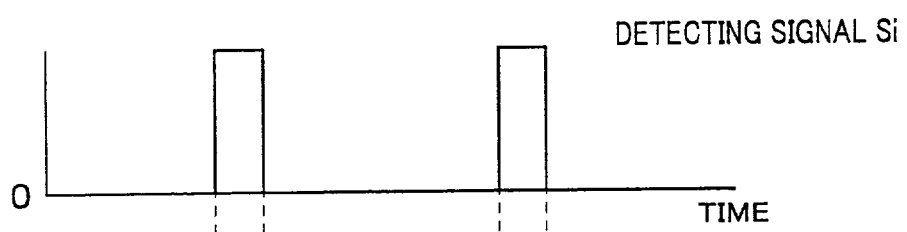
FIG. 4A is a graph showing the one example of the outputting pattern of the detecting signal.

When infrared light is irradiated from the outside of the vehicle at predetermined intervals, the infrared light sensor 5 detects the infrared light shown as the wave profile of FIG. 4A.

Figure 4B:
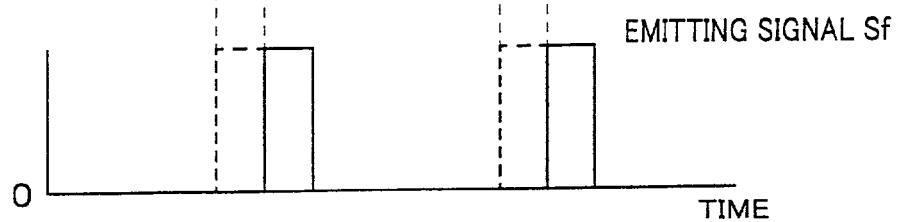
FIG. 4B is graph showing the outputting pattern of the emitting signal.

In that occasion, as shown in the broken line of FIG. 4B, if the image pickup timing established by the timer 23 is overlapped with the infrared light detecting timing, the image pickup is performed after the detection of infrared light is terminated.

As shown in the full line of FIG. 4B, infrared light is irradiated from the infrared light irradiator 4 while the image pickup is performed. In other words, the irradiation of infrared light is continued while the shutter of the infrared camera 3 is released.

At that time, the infrared light, incoming from the surrounding area of the vehicle, is not detected by the infrared light sensor 5. Thus, the image pickup performed by the infrared camera 3 is continued.

Thereby, the image pickup of the surrounding area of the vehicle is achieved by the infrared camera 3 without whiteout phenomenon, by repeating the above-described manner.

As described above, the explanation about the preferred embodiment of the present invention is carried out. The arranging manner of the infrared camera is not restricted to the above-described manner. For example, the manner, in which the image pickup apparatus is provided on the flank of the radiator grille or the headlight, can be adoptable.

In the present invention, the image obtained by performing the image pickup using the infrared camera is displayed on the monitor for notifying the existence of the obstacles to a driver. The notifying manner is not restricted to this case, for example, the manner, in which the alarm is given when the existence of the obstacles is detected, can also be adopted as long as the existence of the obstacles is notified by a driver.

In the present invention, if the infrared light sensor detects the light of infrared region, the operation of the image pickup is delayed. Thus, the occurrences of the whiteout phenomenon caused by the direct pickup of the infrared light irradiated from the outward, for example, irradiated from the oncoming vehicle, can be prevented.

In the image pickup apparatus according to the present invention, the infrared camera is attached to the inner mirror. Thus, there is no need to managing the space for arranging the infrared camera. In the present invention, furthermore, since the infrared light emitting apparatus is provided united with the inner mirror, the production of the apparatus becomes more easily.

In the image pickup apparatus according to the present invention, infrared light is intermittently irradiated synchronizing with the releasing movement of the shutter of the infrared camera. Thus, the waste of energy can be prevented.

What is claimed is:

1. An image pickup apparatus equipped in a vehicle, comprising:
    an infrared light emitter configured to irradiate an infrared light towards a surrounding area of said vehicle;
    an infrared camera configured to perform an image pickup by receiving a reflected infrared light, which is emitted from said infrared light emitter and is reflected by an obstacle present in said surrounding area; and
    an infrared light sensor configured to detect a pulse light ranging from near-infrared region to infrared region irradiated from an oncoming vehicle, wherein:
    said infrared camera delays performing the image pickup, when said infrared light sensor detects said pulse light.

2. The image pickup apparatus according to claim 1, wherein said infrared light emitter and the infrared camera are provided at an inner mirror of the vehicle.

3. The image pickup apparatus according to claim 1, further comprising:
    a synchronizer, which controls irradiation of said infrared light from said infrared light emitter so that the irradiation of said infrared light is intermittently performed and synchronized with a shutter releasing movement of said infrared camera.

4. An image pickup apparatus equipped in a vehicle, comprising:
    an infrared light emitter configured to irradiate an infrared light towards a surrounding area of said vehicle;
    an infrared camera configured to perform an image pickup by receiving a reflected infrared light, which is emitted from said infrared light emitter and is reflected by an obstacle present in said surrounding area;
    an infrared light sensor configured to detect a pulse light ranging from near-infrared region to infrared region irradiated from an oncoming vehicle; and
    a control unit configured to delay performing the image pickup by said infrared camera while said pulse light is detected by said infrared light sensor.

5. The image pickup apparatus according to claim 4, wherein said control unit comprising:
    an infrared light detecting circuit configured to detect whether or not said pulse light is detected by said infrared light sensor;
    a shutter control circuit configured to output a shutter un-releasing signal to said infrared camera while said pulse light is detected by said infrared light detecting circuit, and configured to output a shutter releasing signal to said infrared camera at every pickup interval; and
    an infrared light emitting circuit configured to output a command signal to the infrared light emitter to irradiate the infrared light while said shutter releasing signal is input to said infrared camera.

6. The image pickup apparatus according to claim 1, wherein said infrared camera stops performing the image pickup while said infrared light sensor detects said pulse light irradiated from the oncoming vehicle so that an occurrence of a whiteout phenomenon caused by said pulse light picked up by said infrared camera is prevented.

7. The image pickup apparatus according to claim 4, wherein said control unit delays performing the image pickup by said infrared camera so that an occurrence of a whiteout phenomenon caused by said pulse light picked up by said infrared camera is prevented.

* * * * *